(12) United States Patent
Loghin et al.

(10) Patent No.: US 9,325,448 B2
(45) Date of Patent: Apr. 26, 2016

(54) TRANSMISSION AND RECEIVER APPARATUS AND METHODS

(75) Inventors: Nabil Loghin, Stuttgart (DE); Lothar Stadelmeier, Stuttgart (DE); Joerg Robert, Vreden (DE)

(73) Assignee: Sony Corporation, Tokyo (JP)

( * ) Notice: Subject to any disclaimer, the term of this patent is extended or adjusted under 35 U.S.C. 154(b) by 530 days.

(21) Appl. No.: 13/501,849

(22) PCT Filed: Oct. 15, 2010

(86) PCT No.: PCT/EP2010/065507
§ 371 (c)(1),
(2), (4) Date: Jun. 13, 2012

(87) PCT Pub. No.: WO2011/048020
PCT Pub. Date: Apr. 28, 2011

(65) Prior Publication Data
US 2012/0243561 A1    Sep. 27, 2012

(30) Foreign Application Priority Data

Oct. 20, 2009  (EP) .................................. 09173562

(51) Int. Cl.
*H04L 1/00* (2006.01)
(52) U.S. Cl.
CPC ............ *H04L 1/0006* (2013.01); *H04L 1/0083* (2013.01)
(58) Field of Classification Search
None
See application file for complete search history.

(56) References Cited

U.S. PATENT DOCUMENTS

| 7,424,036 B1 * | 9/2008 | Alexander ............ H04J 3/1611 370/474 |
| 2002/0186672 A1 | 12/2002 | Kilgore |

(Continued)

FOREIGN PATENT DOCUMENTS

| CN | 101465714 | 6/2009 |
| WO | 2009 018180 | 2/2009 |
| WO | 2009/104927 | 8/2009 |

OTHER PUBLICATIONS

U.S. Appl. No. 13/509,131, filed Jul. 12, 2012, Stadelmeier, et al.

(Continued)

*Primary Examiner* — Chirag Shah
*Assistant Examiner* — Amar Persaud
(74) *Attorney, Agent, or Firm* — Oblon, McClelland, Maier & Neustadt, L.L.P.

(57) ABSTRACT

The present invention relates to an apparatus and a corresponding method for mapping error correction code encoded time-domain data of at least two mapping input data streams (S1, S2, . . . , Sn) onto a time-domain mapping output data stream (Q) having a frame structure, comprising a data input (102) for receiving said at least two mapping input data streams (S1, S2, . . . , Sn) each being segmented into data blocks (D1, D2, . . . , DN) carrying error correction code encoded data, a data mapper (104) for mapping the data blocks (D1, D2, . . . , DN) of said at least two mapping input data streams (S1, S2, . . . , Sn) onto frames of said mapping output data stream (Q), each frame comprising a number of frame intervals (F1, F2, . . . , FM), wherein the data mapper (104) is adapted for mapping the data blocks (D1, D2, . . . , DN) onto said frame intervals such that each frame interval (F1, F2, . . . , FM) carries sequentially arranged data blocks (D1, D2, . . . , DN) from various mapping input data streams (S1, S2, . . . , Sn) and that within a frame the mapping of data blocks (D1, D2, . . . , DN) from the various mapping input data streams (S1, S2, . . . , Sn) onto frame intervals (F1, F2, . . . , FM) is different from frame interval to frame interval, and a data output (110) for outputting said mapping output data stream (Q).

12 Claims, 9 Drawing Sheets

(56) References Cited

U.S. PATENT DOCUMENTS

| | | | |
|---|---|---|---|
| 2005/0169234 A1 | 8/2005 | Kilgore | |
| 2008/0298487 A1* | 12/2008 | Peron | 375/260 |
| 2009/0175210 A1* | 7/2009 | Vijayan et al. | 370/312 |
| 2010/0142550 A1 | 6/2010 | Zhang | |
| 2010/0202386 A1* | 8/2010 | Takaoka | H04L 1/0083 370/329 |
| 2010/0215007 A1* | 8/2010 | Zhang | H04L 5/0007 370/329 |
| 2012/0213233 A1* | 8/2012 | Stadelmeier | H04L 5/0005 370/474 |
| 2014/0044094 A1* | 2/2014 | Vijayan | H04B 7/12 370/330 |
| 2014/0064178 A1* | 3/2014 | Kwon | H04H 20/93 370/312 |
| 2014/0298144 A1* | 10/2014 | Ko | H04L 1/0057 714/776 |

OTHER PUBLICATIONS

U.S. Appl. No. 13/579,727, filed Sep. 17, 2012, Stadelmeier, et al.
International Search Report Issued Feb. 4, 2011 in PCT/EP10/65507 Filed Oct. 15, 2010.
Office Action issued Feb. 10, 2015 to Chinese Patent Application No. 201080047672.8 with English translation.

* cited by examiner

TRANSMISSION AND RECEIVER APPARATUS AND METHODS

FIELD OF INVENTION

The present invention relates to an apparatus for mapping error correction code encoded time-domain data of at least two mapping input data streams onto a time-domain mapping output data stream having a frame structure. The present invention also relates to a transmission apparatus for transmitting data within a data transmission system. Further, the present invention relates to corresponding methods as well as a computer program for implementing said mapping method on a computer.

The present invention relates, for instance, to the field of Digital Video Broadcasting (DVB) utilizing Orthogonal Frequency Division Multiplexing (OFDM), in particular to a frame builder used in such data transmission systems for DVB. But the present invention can also be applied in other fields like Digital Audio Broadcasting (DAB).

BACKGROUND OF THE INVENTION

In digital communications or data transmission systems it is known to apply time interleaving or subslicing to combat the effects of time selective fading or the influence of noise bursts. One aspect of time selective fading is the so-called fast fading, which is caused by multipath propagation. The signals of the different paths from a transmitter (or from multiple transmitters of, for instance, OFDM Single Frequency Networks), superimpose each other in amplitude and phase. As especially the phase varies over the frequencies, this causes a frequency selective channel. Therefore, the frequencies at the receiver (i.e. related OFDM sub-carriers) have different reception amplitudes.

Additionally, the amplitude and the phase of the different reception paths also depend on the position of the receiver. In case of a moving receiver, especially the phase of the signals of the different reception paths changes, which causes a time selective channel. The changes in the time direction can also have a very regular structure. The change rate of this structure over the time axis is proportional to the relative velocity of the receiver to the transmitter(s) and the transmission frequency of the signal. Also other disturbances, such as impulsive noise, can have a regular structure, e.g. caused by the line cycle frequency of the power grid or by bursts from other data transmission systems, e.g. a GSM communications system.

Any digital data transmission systems, such as systems in accordance with the DVB-T2 standard (second generation digital terrestrial television broadcasting systems standard), use a framing structure with time interleaving and/or subslicing that applies a regular structure in time domain. This frame structure is generally built by a frame builder, i.e. an apparatus for mapping error correction code encoded time-domain data of at least two mapping input data streams onto a time-domain mapping output data stream.

SUMMARY OF INVENTION

It is an object of the present invention to provide an apparatus and a corresponding method for mapping error correction code encoded time-domain data of at least two mapping input data streams onto a time-domain mapping output data stream having a frame structure which can advantageously be applied in transmitters of data transmission systems with mobile receivers and which provide a good transmission and reception quality despite possible time selective fading effects. Further, it is an object of the present invention to provide a transmission apparatus for transmitting data within a data transmission system and a corresponding transmission method. Still further, it is an object of the present invention to provide a computer program for implementing said mapping method.

According to an aspect of the present invention there is provided an apparatus for mapping error correction code encoded time-domain data of at least two mapping input data streams onto a time-domain mapping output data stream having a frame structure, comprising:

a data input for receiving said at least two mapping input data streams each being segmented into data blocks carrying error correction code encoded data, a data mapper for mapping the data blocks of said at least two mapping input data streams onto frames of said mapping output data stream, each frame comprising a number of frame intervals, wherein the data mapper is adapted for mapping the data blocks onto said frame intervals such that each frame interval carries sequentially arranged data blocks from various mapping input data streams and that within a frame the mapping of data blocks from the various mapping input data streams onto frame intervals is different from frame interval to frame interval, and a data output for outputting said mapping output data stream.

According to another aspect of the present invention there is provided a transmission apparatus for transmitting data within a data transmission system comprising a mapping apparatus in accordance with the present invention as defined above and a transmitter unit for transmitting the mapping output data stream.

According to further aspects of the present invention there is provided a corresponding mapping method as well as a corresponding transmission method.

Finally, according to another aspect there is provided a computer program comprising program code means for causing a computer to carry out the steps of the mapping method in accordance with the present invention, when said computer program is carried out on a computer.

Preferred embodiments of the invention are defined in the dependent claims. It shall be understood that the claimed apparatus, the claimed methods and the claimed computer program have similar and/or identical preferred embodiments as the claimed mapping apparatus and as defined in the dependent claims.

It has been recognized according to the present invention that the regular structure that is applied in the time domain in many communications or data transmission systems in a step of time interleaving and/or subslicing are not optimal or not even suited for mobile receivers due to fading effects caused by multipath and/or Doppler frequencies (or, more precisely, frequency shifts). Due to the periodic structure of multipath or Doppler dependent channel transfer functions in the time direction, particularly when mobile receivers are used, the temporal distance of fadings (or other disturbances having a regular structure) may match exactly the distance of subslices (also called "bursts"; hereinafter generally referred to as "data blocks") of one mapping input data stream. A consequence could then be that the receiver is not able to correct the data of this mapping input data stream (at all, or at least in part) despite the error correction code data that are generally included in this mapping input data stream. Particularly for mobile receivers the temporal distance of fadings and, thus, the data blocks for input data streams which suffer from such fadings cannot be foreseen by the network operator or the transmitter. As the transmitter generally serves a large number of receivers, it is, hence, not adjustable to provide optimal transmission conditions for all receivers.

To overcome this problem it is thus proposed according to the present invention to map the data blocks of the at least two mapping input data streams according to an irregular structure (rather than according to a regular structure as commonly done in the art) onto the frame intervals of the frames of the mapping output data stream. In other words, while conventionally the data blocks are regularly mapped onto the frame intervals of a frame, it is proposed according to the present invention to do this irregularly so that the temporal distance of fadings does no longer exactly match the distance of data blocks belonging to the same mapping input data stream. Hence, such fading effects having a regular periodicity affect data blocks belonging to different mapping input data streams, and an error correction of the affected data streams at the receiver generally allows or at least improves restoration of the affected data streams.

The irregular mapping of the data blocks onto the frame intervals is preferably applied to frames which are regularly structured, e.g. all having the same length, but is also applicable to frames which are irregularly structured, e.g. having different lengths.

According to a preferred embodiment the data mapper is adapted for mapping the data blocks onto said frame intervals such that within a frame the sequence of mapping input data streams, from which data blocks are mapped onto a frame interval, and/or the size of the data blocks arranged within a frame interval is different from frame interval to frame interval. Preferably, the mapping is done such that the sequence of data streams and/or the size of the data blocks arranged within a frame interval is different for all frame intervals of a frame.

Conventionally, as for instance provided for in the DVB-T2 standard, the sequence of the mapping input data streams, from which data blocks are mapped onto a frame interval, is identical for all frame intervals of a frame, and is also identical for all frames. This sequence is predetermined and fixed, and is also known to the receiver to enable it to correctly de-map a received data stream. Further, conventionally the size of the data blocks that belong to the same mapping input data stream is fixed for all frame intervals of a frame and, generally, also for all frames. This results in a regular mapping structure of the data blocks from the various mapping input data streams onto the frame intervals of frames which is broken according to the present invention. Both the sequence of mapping input data streams and/or the size of the data blocks arranged within a frame interval can generally be selected freely by the data mapper such that no longer such a regular mapping structure is achieved.

For instance, in an embodiment for each frame interval of a frame the sequence can be changed, and in another embodiment the size of the data blocks can be changed after each frame interval.

According to another preferred embodiment the data mapper is adapted for mapping the data blocks onto said frame intervals such that the sequence of mapping input data streams, from which data blocks are mapped onto the frame intervals of a frame, and/or the size of the data blocks arranged within a frame interval is identical for all frames. In other words, the mapping structure that is applied in the frames is identical for all frames which has the advantage that the receiver only needs to know little data about the mapping structure applied in the transmitter, in particular the data mapper of the transmitter, in order to correctly de-map a received data stream.

According to another embodiment the data mapper is adapted for mapping the data blocks onto said frame intervals such that the sequence of mapping input data streams, from which data blocks are mapped onto the frame intervals of a frame, and/or the size of the data blocks arranged within a frame interval is different from frame to frame, in particular is different for a plurality of subsequent frames or for all frames. In other words, the mapping structure is not identical for all frames, but is different from frame to frame, in particular is different for a plurality of subsequent frames or even for all frames. This has the advantage that over the frame boundaries no regular mapping structure is present so that also fading effects with a longer duration, i.e. over a plurality of frame boundaries, do not have the above-described negative effects.

Preferably, the data mapper is adapted for mapping the data blocks onto said frame intervals such that within a frame each frame interval comprises at least one data block from each mapping input data stream, in particular exactly one data block from each mapping input data stream. This has the advantage, as is commonly known, that other fading effects by which, for instance, data within a complete frame or a couple of frame intervals are affected, do not prevent the error correction of the affected mapping input data streams.

Advantageously, an embedding unit is further provided in the apparatus for embedding a mapping information into the mapping output data stream comprising an information about the mapping structure of the mapping of the data blocks onto said frame intervals for enabling a correct de-mapping of the mapping output data stream. Generally, it is not necessarily required to embed such a mapping information into the mapping output data stream to inform the receiver, in particular the de-embedding unit of a de-mapping apparatus, about the mapping structure applied by the mapping apparatus. For instance, a fixed (irregular) mapping structure could be applied by the mapping apparatus which is predetermined in advance so that the de-mapping apparatus knows without any additional information how the received data stream has to be de-mapped. Preferably, however, some mapping information is embedded in the mapping output data stream as proposed according to this preferred embodiment. In this way, the applied mapping structure can generally be selected freely and can, for instance, be changed on demand, for instance in response to the respective transmission situation.

For instance, as proposed according to a further embodiment, a mapping rule generator can be provided for generating a mapping rule for use by the data mapper for mapping the data blocks onto said frame intervals according to said mapping rule. The de-mapper in the receiver then requires some information about the generated mapping rule or, at least, some kind of start values for initializing the mapping rule generator if another instance of the mapping rule generator is also provided in the receiver. In such case only those start values for initializing the mapping rule generator need to be transported to the de-mapper in the receiver, preferably as mapping information embedded within the mapping output data stream.

As the mapping structure is particularly determined by the sequence of data blocks within the frame intervals and/or the size of the data blocks arranged within a frame interval the mapping rule generator is preferably adapted for generating said mapping rule comprising a sequence information for use by the data mapper in determining the sequence of mapping input data streams, from which data blocks are mapped onto a frame interval, and/or a size information for use by the data mapper in determining the size of the data blocks arranged within a frame interval.

Various implementations exist for said mapping rule generator. Generally, any means can be used by which a random or pseudo random sequence of values can be generated that are then used to determine the irregular mapping structure. In an embodiment, the mapping rule generator comprises a scrambling unit for generating a scrambling factor or a shift register, in particular a linear feedback shift register, for generating a shift factor for use as a sequence information by the data mapper in determining the sequence of mapping input data streams, from which data blocks are mapped onto a frame interval. Such a scrambling unit or feedback shift register can be easily implemented by appropriate hardware (in analogous circuitry or digital logic) and/or software.

Preferably, the present invention can be applied in data transmission systems for digital video broadcasting, for instance for terrestrial television broadcasting or for broadcasting for handheld terminals (according to the DVB-H, DVB-T2 or the upcoming DVB-NGH standard). When applied in those systems the data input is preferably adapted for receiving said at least two mapping input data streams representing physical layer pipes, each physical layer pipe being segmented into subslices or bursts carrying error correction code encoded data, as commonly used in those data transmission systems. In this context of DVB "physical layer pipe" is understood to be a physical layer (TDM) channel that is carried by the specified subslices, which may carry one or multiple services, and "subslice" is understood to be a group of cells from a single PLP, which before frequency interleaving, are transmitted on active OFDM cells with consecutive addresses over a single RF channel.

However, the invention can also be applied in other data transmission or communications systems, for instance in digital mobile systems like DAB (Digital Audio Broadcasting) or MediaFLO (Media Forward Link Only).

According to further aspects a system and a corresponding method for transmitting and receiving data are presented according to the present invention. Such a system comprises a transmission apparatus as described above and a corresponding receiver apparatus, wherein the receiver apparatus comprises a) a receiving unit for receiving a time-domain de-mapping input data stream having a frame structure, and b) an apparatus for de-mapping said time-domain de-mapping input data stream having a frame structure into at least two de-mapping output data streams carrying error correction code encoded time-domain data. Said apparatus for de-mapping comprises b1) a data input for receiving said time-domain de-mapping input data stream having a frame structure of frames, each frame comprising a number of frame intervals, wherein each frame interval carries sequentially arranged data blocks from various de-mapping output data streams and wherein within a frame the mapping of data blocks from the various de-mapping output data streams onto frame intervals is different from frame interval to frame interval, b2) a data de-mapper for de-mapping the frames of said de-mapping input data stream into said at least two de-mapping output data streams, wherein from frame interval to frame interval within a frame the de-mapping of data blocks into said at least two de-mapping output data streams is made differently, and b3) a data output for outputting said at least two de-mapping output data streams. The apparatus for de-mapping may advantageously be further arranged in embodiments in equivalent manner as described above for the apparatus for mapping.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
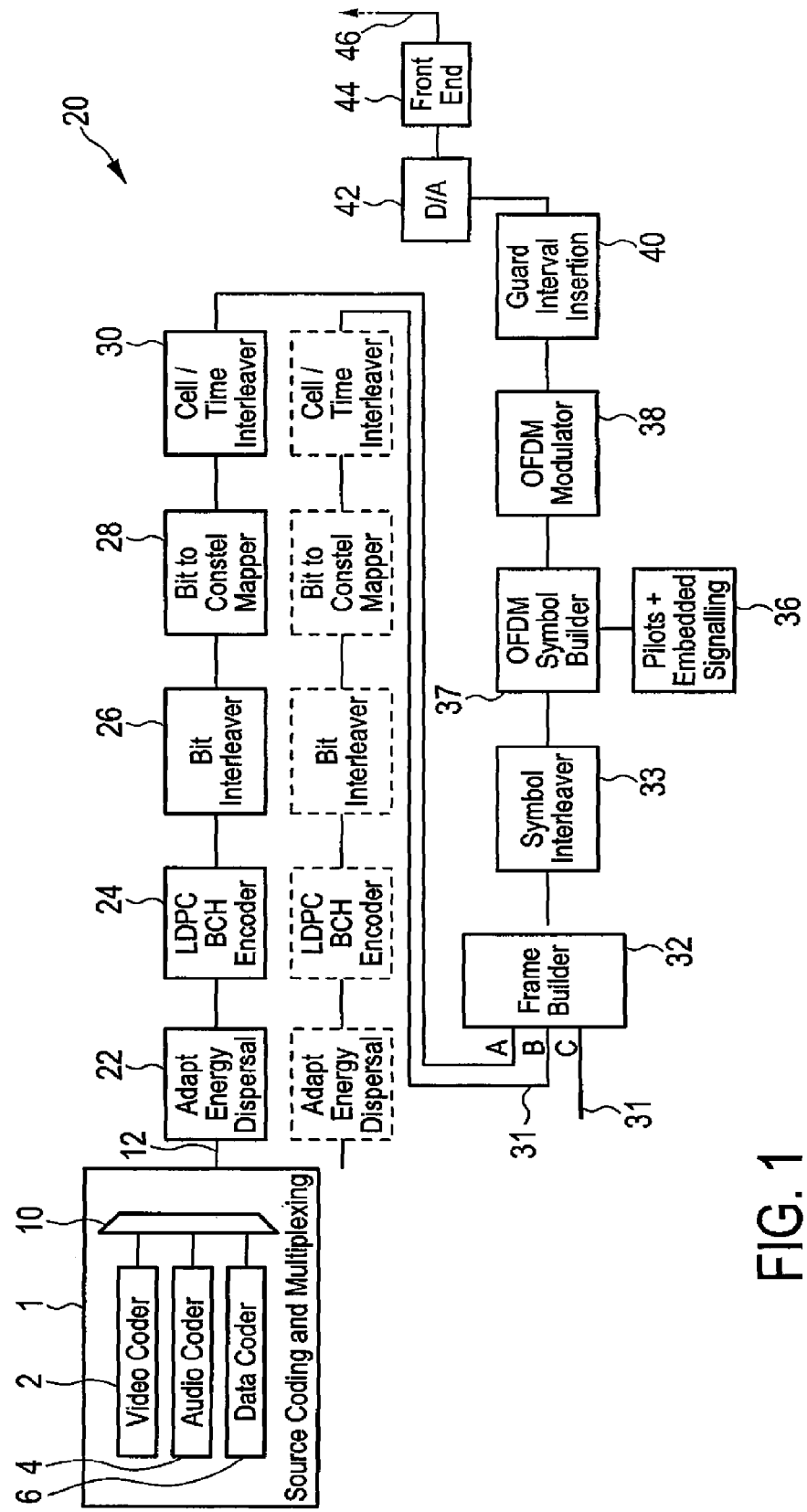
FIG. 1 shows a schematic block diagram of an embodiment of a transmission apparatus according to the present invention.

FIG. 1 provides an example block diagram of a Coded OFDM (COFDM) transmitter 20 which may be used for example to transmit video images and audio signals in accordance with the DVB-T2 standard and in which the invention can be used. In FIG. 1 a program source 1 generates data to be transmitted by the COFDM transmitter 20. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 a COFDM transmitter 20 obtains the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which, for the example of DVB-T2, is the LDPC/BCH (Low-Density-Parity-Check/Bose-Chaudhuri-Hocquenghem) encoder output.

The output from the bit interleaver 26 is fed to a bit into constellation mapper 28, which maps groups of bits onto a constellation point, which is to be used for conveying the encoded data bits. The outputs from the bit into constellation mapper 28 are constellation point labels that represent real and imaginary components. The constellation point labels represent data symbols formed from two or more bits depending on the modulation scheme used. These data symbols are passed through a cell and time interleaver 30 whose effect is to interleave data symbols resulting from multiple LDPC code words.

The data symbols (a multitude of which correspond to a "data block" as discussed above and below with reference to the present invention) are received by a frame builder 32, with data symbols produced by branch B etc. in FIG. 1, via other channels 31. The frame builder 32 then forms many data symbols into sequences to be conveyed on COFDM symbols, where a COFDM symbol comprises a number of data symbols, each data symbol being mapped onto one of the sub-carriers. The number of sub-carriers will depend on the mode of operation of the system, which may include, e.g., one of 1 k, 2 k, 4 k, 8 k, 16 k or 32 k. Thus in one example, the number of sub-carriers for the 16 k mode is 12096.

Each frame comprises many such COFDM symbols. The sequence of data symbols to be carried in each COFDM symbol is then passed to the symbol interleaver 33. The COFDM symbol is then generated by a COFDM symbol builder block 37 which introduces pilot and synchronising signals fed from a pilot and embedded signal former 36 into the frequency interleaved data symbols. An OFDM modulator 38 then forms the OFDM symbol in the time domain which is fed to a guard interval insertion processor 40 for generating a guard interval between OFDM symbols, and then to a digital to analogue converter 42 and finally to an RF amplifier within an RF front 44 for broadcast by the COFDM transmitter, e.g. from an antenna 46.

Figure 2:
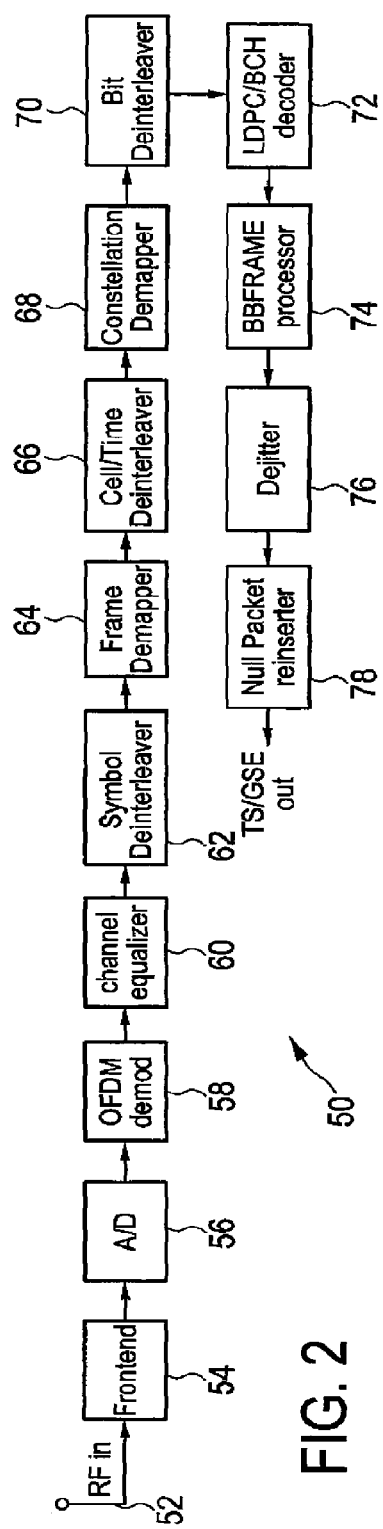
FIG. 2 shows a schematic block diagram of an embodiment of a receiver apparatus.

FIG. 2 shows an example block diagram of a COFDM receiver 50 which may be used for example to receive video images and audio signals from a COFDM transmitter shown in FIG. 1 in accordance with the DVB-T2 standard.

An RF signal received at antenna 52 is fed to a frontend (e.g. a tuner) 54 and thereafter converted into a digital signal by an analogue to digital converter 56. The digital stream is then demodulated by an OFDM demodulator 58, whereafter the stream is provided to a channel equalizer 60, a symbol deinterleaver 62 and a frame demapper 64 in which the data symbols that have been formed into sequences by the frame builder 32 of the transmitter are de-mapped. Thereafter, the data are de-interleaved by a cell- and time de-interleaver 66 and a bit de-interleaver 70. Between these units 66 and 70 constellation points are de-mapped onto groups of bits by a constellation demapper 68. Error correction is performed by an LDPC/BCH decoder 72. Thereafter follow a BBFRAME (baseband frame) processor 74, a dejitter unit 76 and a Null Packet reinserter 78, from which the transport streams (TS) or generic stream encapsulation (GSE) stream are outputted. More details of the general layout and the function of such a receiver 50 can, for instance, be found in the DVB-T2 standard (in particular in DVB Document A133, February 2009, "Implementation guidelines for a second generation digital terrestrial television broadcasting system (DVB-T2)") which explanations are herein incorporated by reference and which shall thus not be explicitly explained in more detail here.

Figure 3:
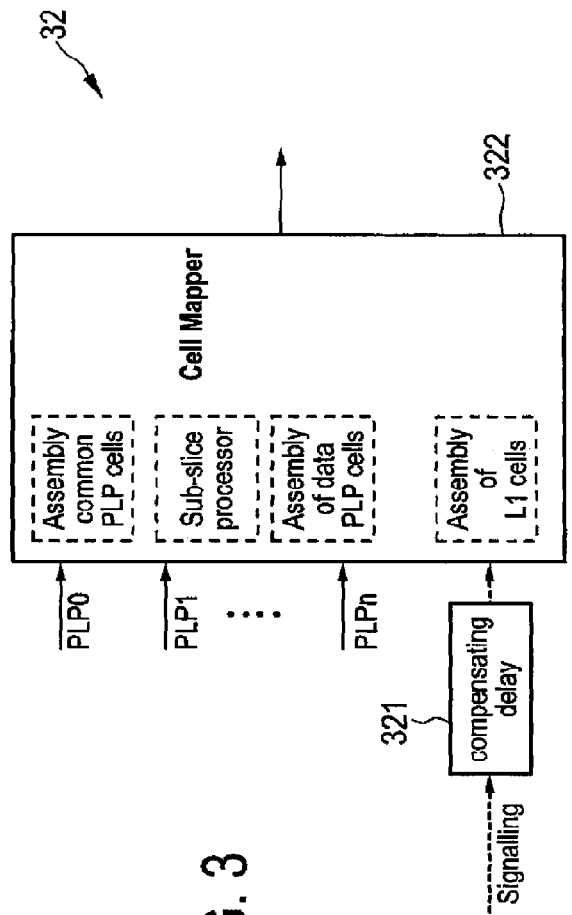
FIG. 3 shows a schematic block diagram of a frame builder as used in the transmission apparatus shown in FIG. 1.

The mapping apparatus according to the present invention can be used in such a transmitter and can favourably be implemented in the frame builder 32. A block diagram of a frame builder 32 as described in the DVB-T2 standard and as used in the transmitter shown in FIG. 1 is shown in FIG. 3. The frame builder 32 comprises a compensation unit 321 and a cell mapper 322. The compensation unit 321 receives as input modulated L1 signalling data and compensates for any frame delay in an input module (in particular the adaption and energy dispersal block 22) and any delay in the time interleaver 30. The cell mapper 322 receives as input the output from the compensation unit 321 and n+1 physical layer pipes PLP0-PLPn. The cell mapper 322 assembles the modulated cells of the PLPs and L1 signalling into arrays of active OFDM cells corresponding to each of the OFDM symbols which will make up the overall frame structure. The cell mapper 322 operates according to dynamic scheduling information produced by a scheduler (not shown in FIG. 1) which is generally part of the input processing and the configuration of the frame structure. The output of the cell mapper 322, e.g. the arrays of active OFDM cells, is then provided to subsequent processing, e.g. frequency interleaving and OFDM generation. The present invention explained in detail below is generally implemented in the frame builder 32 (FIG. 1), in particular the cell mapper 322 (FIG. 2) and/or the scheduler.

The frame de-mapper 64 of the receiver shown in FIG. 2 must be adapted accordingly so that it is able to de-map the received data stream that has been structured by a mapping apparatus implemented in the frame builder 32 of the transmitter shown in FIG. 1.

Figure 4:
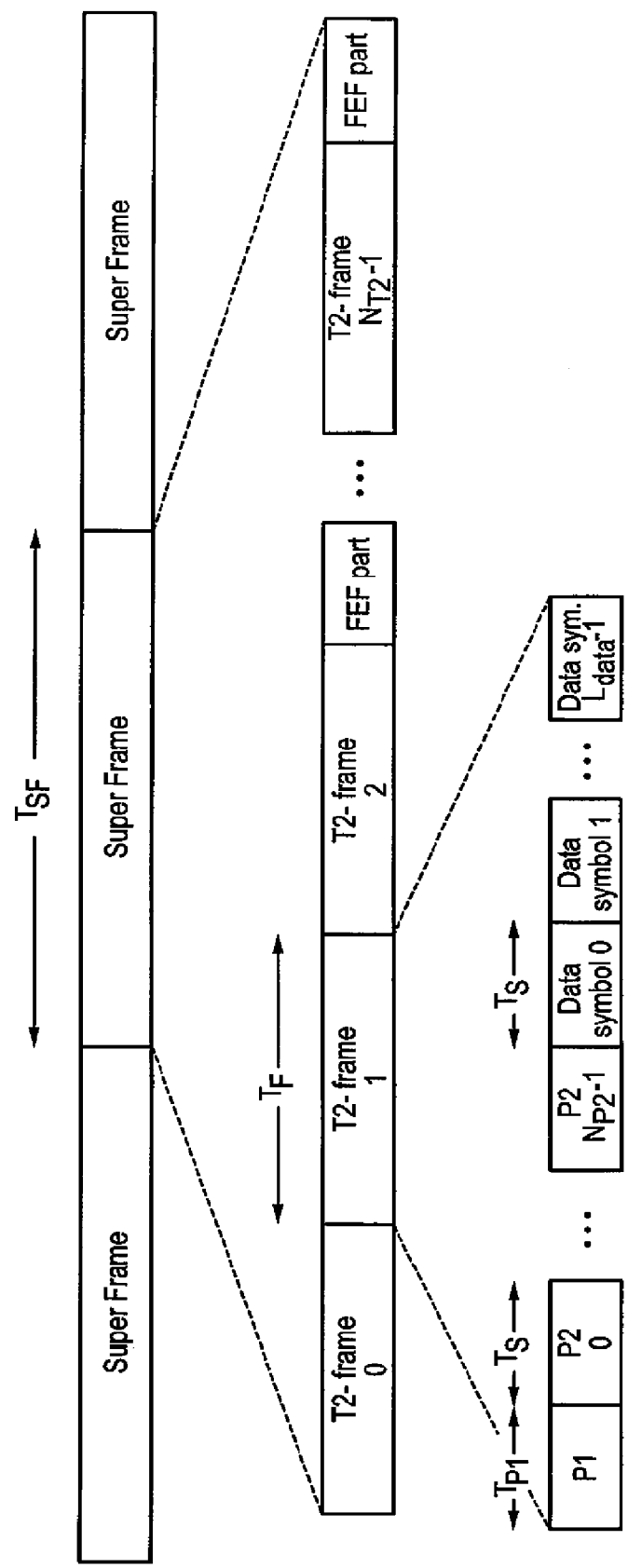
FIG. 4 shows a diagram illustrating the DVB-T2 frame structure.

The DVB-T2 frame structure is shown in FIG. 4. At the top level, the frame structure consists of super-frames, which are divided into T2 frames, which are further divided into OFDM symbols. The super-frame may in addition have future extension frames (FEF) enabling carriage of frames defined in future extensions of the standard.

As shown in FIG. 4 the T2-frame comprises one P1 preamble symbol, followed by one or more P2 preamble symbols, followed by a configurable number of data symbols. The purpose and the insertion of these preamble symbols as well as the general formation of the T2-frames and of the super-frames are explained in detail in the DVB-T2 standard (in particular in ETSI EN 302 755 V1.1.1 (2009-09) "Digital Video Broadcasting (DVB): Frame structure channel coding and modulation for a second generation digital terrestrial television broadcasting system (DVB-T2)" and in the above cited implementation guidelines for DVB-T2) which explanations are herein incorporated by reference and which shall thus not be explicitly explained in more detail here.

Figure 5:
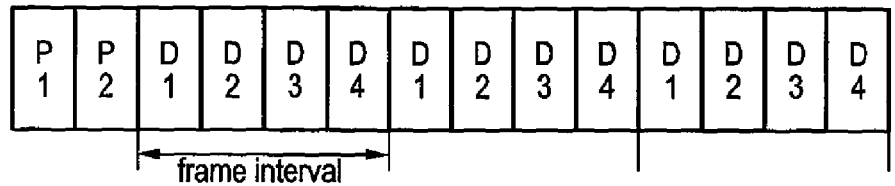
FIG. 5 shows a diagram of a single frame illustrating a regular mapping structure of data blocks onto the frame intervals of the frame.

If time interleaving or subslicing is used in transmitters of digital communications or data transmission systems, the data is spread over a longer time period. In case of the OFDM modulated DVB-T2 system data are interleaved and transmitted in multiple data blocks (multiple data blocks being called a subslice in the DVB-T2 standard; also referred to as burst sometimes). This is illustrated in FIG. 5 showing a diagram of a single frame, e.g. in accordance with the DVB-T2 standard. At the beginning of each DVB-T2 frame there is a preamble (preamble symbols P1 and P2) that allows for synchronization as well as for extraction of the L1 signalling. The following payload data of one PLP (generally also referred to as "mapping input data stream" herein) can be transmitted in multiple subslices, each marked by D1 for PLP1, D2 for PLP2, etc.: generally up to DN for PLPN; N being 4 here in this example).

Generally, the frame is subdivided into frame intervals (called "subslice intervals" according to the DVB-T2 standard) onto which the data blocks ("subslices") of the various (here four) mapping input data streams ("physical layer pipes") are mapped. According to the standard a regular mapping structure is applied as shown in FIG. 5. Accordingly the sequence of the mapping input data streams, from which data blocks are mapped onto a particular frame interval are mapped, is identical for all frame intervals of the frame. In other words, the sequence D1-D2-D3-D4 of data blocks in a frame interval is the same for all frame intervals of the frame. Further, the length of the data blocks of one particular mapping input data stream (e.g. all D1 data blocks) is always constant in all frame intervals. In the examples shown in FIG. 5, the length of the data block is also identical for all mapping input data streams in all frame intervals of the frame, although this is not generally required. According to the DVB-T2 standard, the data blocks of different mapping input data streams may also have different lengths, e.g. the data blocks D1 may have a different length than the data blocks D2 and/or D3 and/or D4. Generally, also the frames are regularly structured, i.e. the length of the frames is identical for all frames.

If data of one (or a few) data blocks is (are) lost or disturbed, a corresponding data stream can be recovered by a receiver by means of the (forward) error correction, if the data of the remaining data blocks of this data stream are received correctly (in particular with sufficient quality). However, this regular mapping structure may also cause problems due to the regular structure of the Doppler or time-variant multipath dependent channel transfer function in time direction as explained above. This is particularly true for all mobile receivers as the velocity of the receiver in addition to the transmission frequency may cause temporal fading as depicted in FIG. 6.

Figure 6:
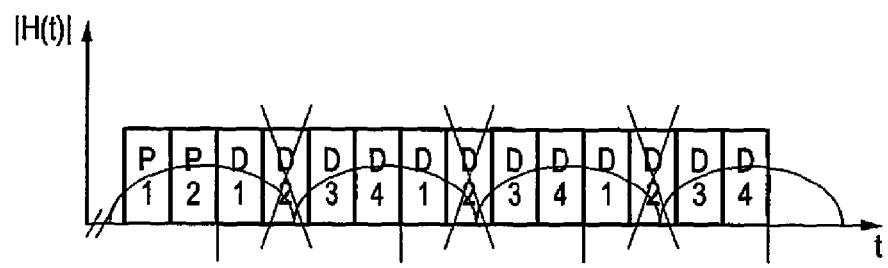
FIG. 6 illustrates the effect of temporal fading on a frame including regularly structured data blocks.

FIG. 6 shows the absolute value of the channel transfer function in case of temporal fading superposed to one frame of data mapped according to a regular mapping structure as shown in FIG. 4. As can be seen the temporal distance of fadings matches exactly the distance of data blocks (subslices or bursts) of one particular mapping input data stream (PLP) in particular the data blocks D2 of the second mapping input data stream (PLP2). Thus, all data blocks of this mapping input data stream are affected, and consequently, the receiver will not be able to correct the data of this data stream by means of the error correction data included in this data stream.

As the temporal distance of the fadings is also dependent on the receiver velocity (and other impulsive noise disturbances), it is practically impossible for the network operator to place the data blocks into the frame intervals of the frames in such a way that this negative fading effect practically does not occur at any receiver and any data stream. This negative effect gets particularly important, if the duration of the data blocks (i.e. the burst duration or subslice duration) is far less than the channel coherence time, i.e. the distance between two fades, because there is no interleaving effect within the data block itself. Further, as mentioned above, in such broadcasting systems the transmitter can not be adjusted for optimal transmission to all receivers it is serving.

Figure 7:
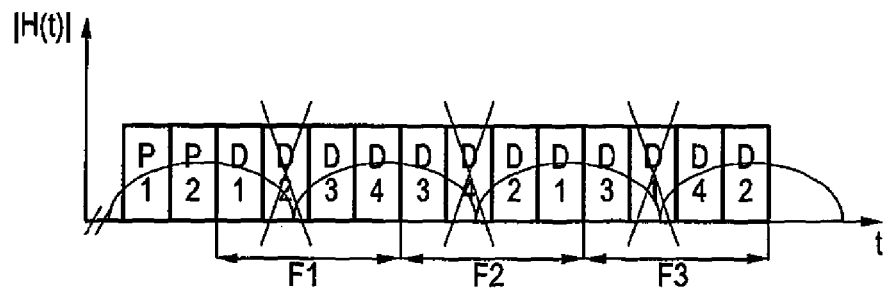
FIG. 7 illustrates a frame including irregularly structured data blocks as proposed in an embodiment of the present invention and the effect of temporal fading.

This negative effect is avoided or at least mitigated by breaking the regular mapping structure of the data blocks as proposed according to the present invention and as depicted in FIG. 7 showing an embodiment of an irregular mapping structure. According to this embodiment the position of the data of one mapping input data stream (one PLP) is changed within one frame interval (subslice interval), i.e. the sequence of the mapping input data streams from which data blocks are subsequently arranged within a frame interval is different from frame interval to frame interval within the frame. As shown in FIG. 6, in the first frame interval F1 (out of generally M frame intervals F1, F2, . . . , FM; M being 3 here in this example) the sequence is D1, D2, D3, D4, while in the second frame F2 interval the sequence is D3, D4, D2, D1, while in the third frame F3 interval the sequence is D3, D1, D4, D2.

Hence, the regular mapping structure in the time domain, as shown in FIGS. 5 and 6, is broken according to the present invention. The consequence is, that not only the data blocks of one mapping input data stream are affected by the fades, but the negative effects of the fades are equally split over all transmitted mapping input data streams (PLPs). As a consequence, the error correction in the receiver is able to correct the data completely or to a larger extent/with higher probability.

Regarding the modifications of the regular mapping structure to obtain such an irregular mapping structure various options and embodiments exist, e.g. regarding the change of the mapping sequence of data blocks onto the frame intervals of the frames. One option is that for all frames the same modifications are applied, i.e. after each frame the same mapping structure is used again. According to another option, the frame boundaries are not taken into account when applying a certain mapping rule for obtaining such an irregular mapping structure, i.e. the irregular mapping structure is generally not identical for subsequent or all frames.

Further, the same sequence of data blocks is not applied in subsequent frame intervals. Preferably, for each frame interval of a frame a different sequence is used. According to still another option the sequences are preferably selected such that data blocks from the same mapping input data stream are not arranged next to each other at a boundary of two neighbouring frame intervals to avoid other negative effects of other negative (longer) fadings.

Figure 8:
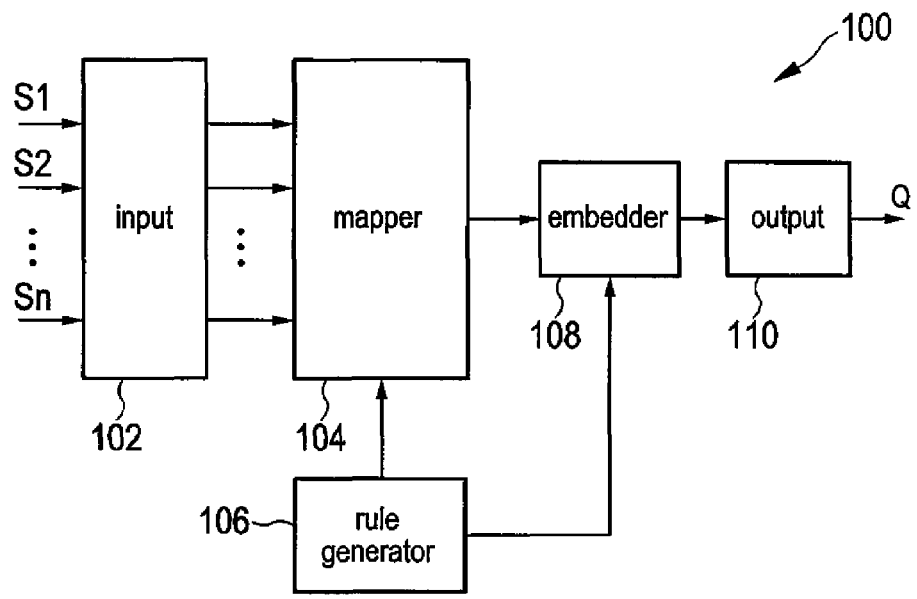
FIG. 8 shows a schematic block diagram of a mapping apparatus according to the present invention.

A schematic block diagram of a mapping apparatus 100 according to the present invention is shown in FIG. 8. The mapping apparatus 100 comprises a data input 102, a data mapper 104, a mapping rule generator 106, an embedding unit 108 and a data output 110. The data input 102 receives n (at least two; in the embodiment of FIG. 7 four) mapping input data streams (PLPs), S1, S2, . . . , Sn, which are each segmented into data blocks and carry error correction code encoded data for error correction by the receiver. The received mapping input data streams S1, S2, . . . , Sn are forwarded to the data mapper 104 which maps the data blocks of said at least two mapping input data streams S1, S2, . . . , Sn onto frames of a mapping output data stream according to an irregular mapping structure as explained above. In this embodiment the data mapper 104 is provided with a mapping rule generated by a mapping rule generator 106. Said mapping rule generator 106 may, for instance, provide information to the data mapper 104 according to which sequence the data blocks from the various mapping input data streams S1, S2, . . . , Sn shall be mapped subsequently onto the frame intervals of the frames of the mapping output data stream. After the mapping the data stream is provided from the data mapper 104 to the embedding unit 108 in which a mapping information is embedded into the mapping output data stream comprising an information about the applied mapping structure. For instance, the mapping information comprises the mapping rule generated by the mapping rule generator 106 and/or some parameters which enable the receiver to reconstruct the applied mapping rule by another instance of the mapping rule generator provided in the receiver. The mapping output data stream Q including the embedded mapping information is then provided to the data output for outputting the mapping output data stream Q for further processing and transmission.

Figure 9A:
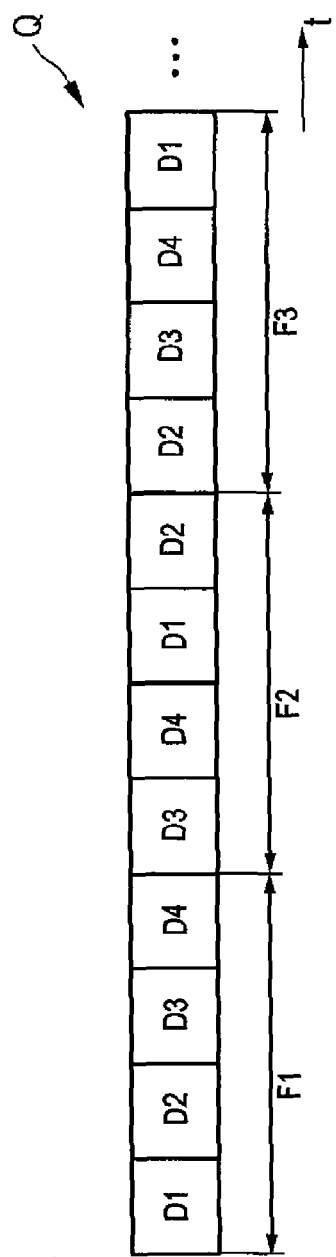
FIG. 9 shows a mapping output data stream before and after post-processing.

For illustrative purposes, a segment of such a mapping output data stream Q (before any subsequent processing) is shown in FIG. 9A in which the irregular mapping structure of the data blocks D1, D2, D3, D4 on three subsequent frame intervals can be seen. In the transmitter (e.g. as shown in FIG.

Figure 9B:
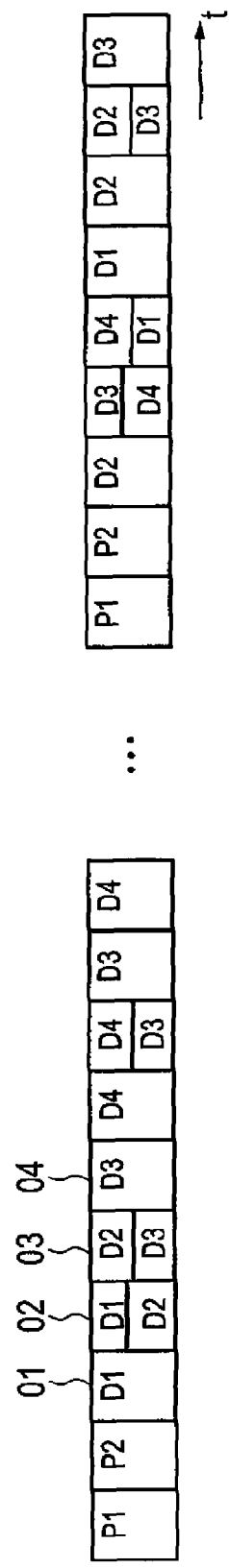

1) the mapping output data stream Q is then further processed in various steps. For instance, in the OFDM Symbol Builder 37 and the OFDM modulator 38 preamble symbols P1, P2 are added and the data stream is subjected to an IFFT processing. Therein, the repetitive character and the sequence of the data blocks in the data stream is kept, but the OFDM symbols are generally formed such, that one OFDM symbol does not necessarily comprise one data block, but—as shown in FIG. 9B depicting the mapping output data stream Q after such post-processing—one OFDM symbol O1, O2, O3, O4, . . . comprises only part of one data block D1, D2, D3, D4 or comprises parts from different (in the mapping output data stream Q subsequently arranged) data blocks. For instance, the OFDM symbol O1 comprises the first part of data block D1 and the second OFDM symbol O2 comprises the second part of data block D1 and the first part of data block D2.

Figure 10:
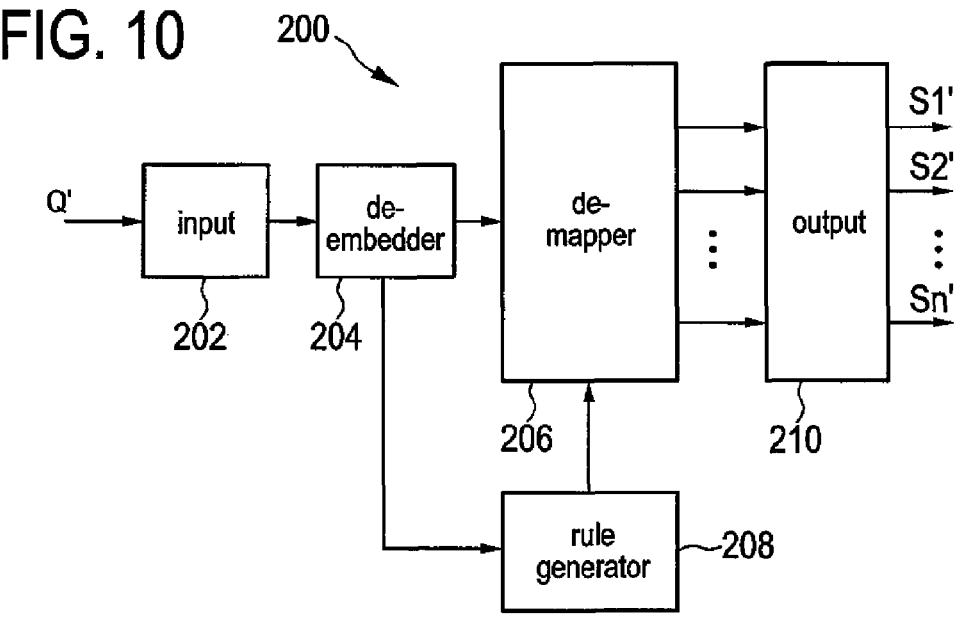
FIG. 10 shows a schematic block diagram of a de-mapping apparatus.

A schematic block diagram of a corresponding de-mapping apparatus is shown in FIG. 10. The de-mapping apparatus 200 comprises a data input 202, a de-embedding unit 204, a data de-mapper 206, a de-mapping rule generator 208 and a data output 210. The data input 202 receives a time-domain de-mapping input data stream Q' which, after reception and preprocessing by other elements of the receiver, generally corresponds to the mapping output data stream Q as outputted by the data output 110 of the mapping apparatus 100. However, depending particularly on the characteristics and the quality of the transmission of the transmission channel more or less errors are included in the received de-mapping input data stream Q' compared to the mapping output data stream. The de-mapping input data stream is then forwarded to the de-embedding unit 204 which de-embeds any mapping information that had been embedded therein by the mapping apparatus as de-mapping information and forwards said de-embedded mapping information to the de-mapping rule generator 208, whereas the de-mapping output data stream is forwarded to the data de-mapper 206. The de-mapping rule generator 208 reconstructs the information about the mapping structure according to which the data blocks from the various data streams are mapped onto the frame intervals of the received de-mapping input data stream, in particular the mapping rule that had been applied by the data mapper 104. This de-mapping information is provided to the data de-mapper 206 which is then able to correctly de-map the data blocks from the de-mapping input data stream onto at least two de-mapping output data streams S1', S2', . . . , Sn', which, if the de-mapping could be made correctly, correspond to the mapping input data streams S1, S2, . . . , Sn provided as input to the data mapper 104. These de-mapping output data streams S1', S2', . . . , Sn' are forwarded to the data output 210 from which they are outputted for further processing in the receiver.

By embedding the mapping information into the mapping output data stream as explained with reference to FIGS. 8 and 9 it is ensured that the receiver knows sufficient information in order to correctly de-map a received data stream. The additional signalling requirements for this approach, for instance compared to the current DVB-T2 specification, are very limited. If the order of the data blocks is changed every frame interval, the receiver is able to calculate the position within each frame interval by means of the (generally known) length of each data block and the known change of mapping structure.

However, other embodiments to ensure that the receiver can correctly de-map a received data stream exist.

For instance, rather than embedding some information in the mapping output data stream by the transmitter, it is possible to use a predetermined and fixed mapping structure that is both known to the transmitter and receiver in advance, e.g. because it is specified in a standard. Consequently the receiver does not need to receive any information, for instance mapping information as mentioned above, along with the received data stream. In such a case the mapping rule generator 106 and the embedding unit 108 as well as the de-mapping rule generator 208 and the de-embedding unit 204 can be omitted in the transmitter and the receiver, respectively according to one embodiment. In another embodiment, in this case, the mapping rule generator 106 and the de-mapping rule generator 208, but no embedding unit 108 and no de-embedding unit 204 are provided in the transmitter and the receiver, respectively, since the mapping rule generator 106 and the de-mapping rule generator 208 are able to generate the mapping rule based on given information about the predetermined and fixed mapping structure.

In a still further embodiment which does not require a rule generator both in the transmitter and the receiver, additional information may be transmitted along with a data stream that directly tells the receiver how the data blocks have been mapped onto the frame intervals. For instance, a future extension frame (or parts thereof) of a superframe (see FIG. 4) could be used to insert sequence information that tells the data de-mapper the sequence how the data blocks are arranged in the frames of the same superframe.

Similarly, in an embodiment such additional information allowing the receiver to correctly de-map a received data stream can be inserted in the header of each data block. For instance, some kind of address information may be included in the header of each data block (as generally applied in DVB-H systems) telling the de-mapping apparatus to which data stream the data block belongs.

If, as shown above in FIG. 7, the irregular mapping structure is obtained by changing the order of the data blocks from frame interval to frame interval, the mapping rule generator 106 (and also the de-mapping rule generator 208) may comprise a Linear Feedback Shift Register (LFSR) or any other Pseudo Binary Random Sequence (PRBS) generator. Similar pseudo random structures like e.g. demultiplexers, look-up tables or architectures as applied in the frequency interleaver according to the DVB-T2 standard, might be chosen, too. An embodiment of a practical implementation is illustrated in FIGS. 10 and 11.

Figure 11:
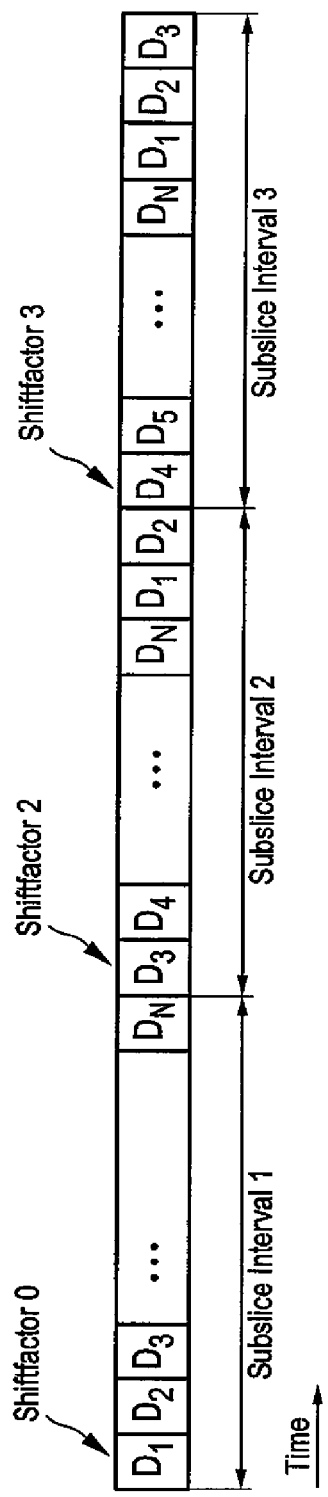
FIG. 11 shows several frames with irregularly structured data blocks according to the present invention.

FIG. 11 shows an embodiment of the frame comprising three subslice intervals (frame intervals) and N physical layer pipes (mapping input data streams). To achieve a breaking of the regular mapping structure along the time axis, as proposed according to the present invention, the data block that starts within each frame interval is cyclically shifted from frame interval to frame interval. This cyclic shift is reached by means of a shift factor. The starting positions of the individual data blocks within each frame interval can then be calculated by means of the length of the data blocks within each frame interval (which are known to the receiver anyway) and the shift factor. However, it is also possible to apply other scrambling means, which may not keep the order of the mapping input data streams from which data blocks are subsequently arranged within each frame interval.

Figure 12:
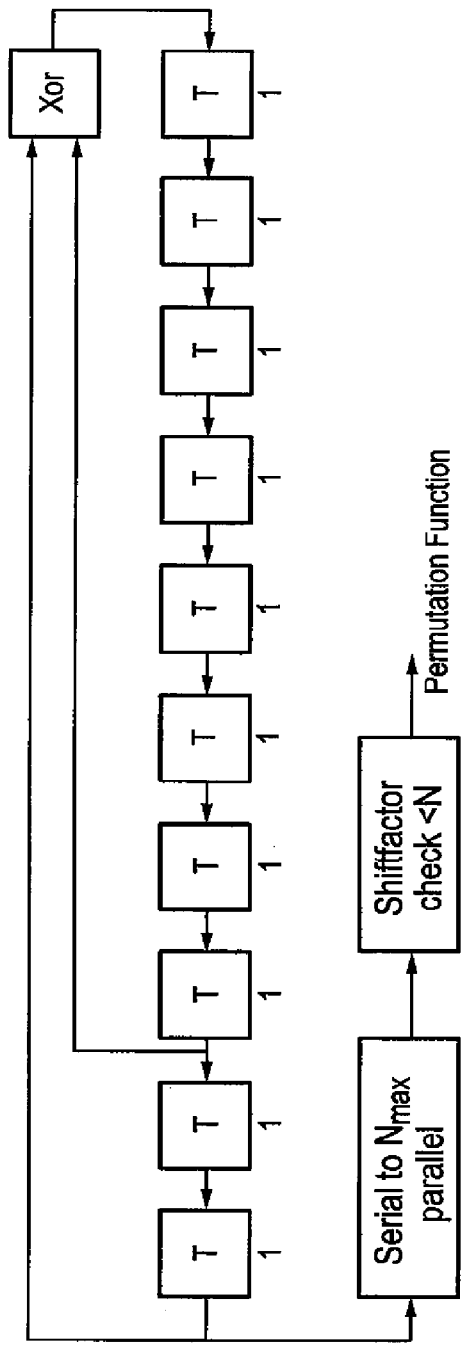
FIG. 12 shows a schematic block diagram of a linear feedback shift register for use as mapping rule generator in the mapping apparatus shown in FIG. 8.

FIG. 12 depicts an embodiment of an implementation for the generation of the shift factor. Its value is obtained by means of a linear feedback shift register. At the beginning of each complete frame all registers are e.g. initialized with "1". Then, the register is running freely until the next complete frame, i.e. it is not re-initialized at the beginning of the new frame interval, but at the beginning of a new frame in this embodiment (in other embodiments the register may not be re-initialized at the beginning of each new frame that may thus continue to run freely). The "serial to $N_{max}$ parallel" block takes $N_{max}$ subsequent outputs of the register and creates a binary word consisting of $N_{max}$ values. A factor $N_{max}$ is the smallest possible number for which the equation $N \leq N_{max} = 2^K$ with $K=1, 2, 3, \ldots$ holds. Here, the value N is the number of mapping input data streams.

The block "shift factor check" verifies that the resulting binary word is smaller than the actual number of mapping input data streams, i.e. that the shift factor is smaller than N. If this equation is not fulfilled the shift factor is discarded and a new $N_{max}$ binary word is generated by the register. If the shift factor is in the valid range, it is used within one frame interval to cyclically shift the data blocks as shown in FIG. 11. As mentioned above, a new shift factor is generated according to this embodiment for each frame interval, and the register is re-initialized at the beginning of each new frame.

Figure 13:
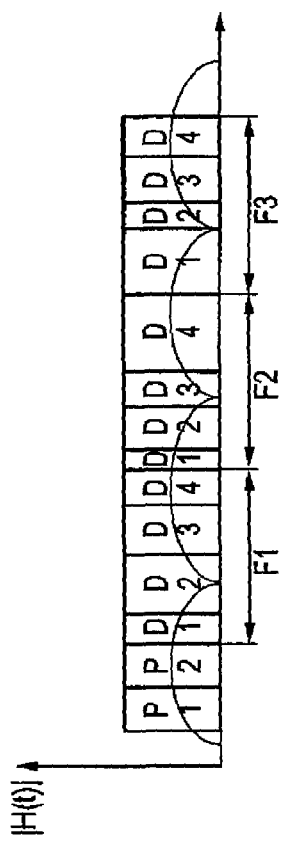
FIG. 13 illustrates a frame including irregularly structured data blocks as proposed in another embodiment of the present invention and the effect of temporal fading.

Another embodiment by which an irregular mapping can be obtained shall be illustrated with reference to FIG. 13 showing the absolute value of the channel transfer function superposed to one frame comprising three frame intervals. According to this embodiment, the sequence of the mapping input data streams from which data blocks are mapped onto the frame intervals is not changed from frame interval to frame interval, but the size of the data blocks is changed from frame interval to frame interval (the frame intervals, however, have an identical fixed size). For instance, looking at the data blocks D1 it can be seen that in the first and second frame intervals F1, F2 they are rather short in time, while D1 is rather long in the third frame interval F3. Similar variations are made to the other data blocks from other mapping input data streams. The effect is, as shown in FIG. 13, that the fades of the channel transfer function do not affect only data blocks from the same mapping input data stream. For instance, in the first frame interval F1 mainly data block D2 is affected, in the second frame interval F2 mainly data block D3 is affected and in the third frame interval F3 mainly data block D1 is affected. Thus, all data streams can be corrected by use of the error correction data in the receiver.

According to still a further embodiment the irregular mapping structure can be obtained by a mix of a change in the sequence of the mapping input data streams from which data blocks are mapped subsequently onto frame intervals (as shown in FIG. 7) and changes in the sizes of the data blocks (as shown in FIG. 13). In this case, however, more information needs generally to be provided to the receiver to de-map a received data stream.

In the above, embodiments have been described according to which, when applied to systems in accordance with or similar to the DVB-T2 standard, the mapping structure of data blocks mapped onto T2-frames is changed. According to another embodiment, the mapping structure of data blocks mapped onto T2-frames remains unchanged (e.g. as prescribed in the DVB-T2 standard), but only the mapping of data blocks mapped onto future extension frames (FEF) is done irregularly in accordance with the present invention. Such an embodiment can, for instance, find application in data transmission systems in which the data transported within the T2-frames is provided for reception by stationary receivers, while the data transported within the FEF frames is provided for reception by mobile receivers. Of course, in still another embodiment, it is also possible to employ the present invention for mapping of data blocks on both the T2-frames and the FEF frames.

The embodiments described above are, for instance, applicable to the mapping of subslices (i.e. data blocks) of physical layer pipes (i.e. mapping input data streams) of type 2 as proposed in the DVB-T2 standard. Such type 2 PLPs generally have two or more subslices (i.e. data blocks) per T2-frame, but the invention is also applicable if a PLP (or, more generally, a mapping input data stream) has only one subslice (i.e. one data block) per frame.

Figure 14:
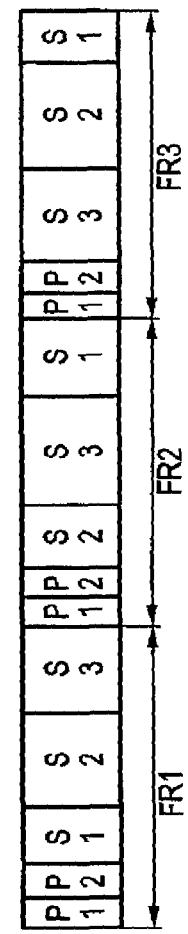
FIG. 14 shows several frames with irregularly mapped data streams according to a further embodiment of the present invention.

Further, the present invention may also be applied for the mapping of subslices (i.e. data blocks) of physical layer pipes (i.e. mapping input data streams) of type 1 as proposed in the DVB-T2 standard. Such type 1 PLPs generally have only one slice per T2-frame, a slice being a set of all cells of a PLP which are mapped to a particular T2-frame, i.e. in such type 1 PLPs the slices are not further subdivided into subslices as is the case for type 2 PLPs. Such an embodiment shall be illustrated with reference to FIG. 14 showing a simplified diagram of three subsequent frames FR1, FR2, FR3, each comprising three PLPs (data streams) S1, S2, S3 after the preambles P1, P2.

As can be seen that three PLPs (e.g. of type 1 in the sense of the DVB-T2 standard, i.e. which are not divided into subslices or data blocks) are mapped irregularly onto the subsequent frames FR1, FR2, FR3, i.e. the sequence of the three PLPs is changed from frame to frame. This generally provides the same advantage as described above that regular fadings or other regular disturbances do not only affect a single PLP to a large extent so that this PLP is much disturbed (e.g. so that it is not (practically) reconstructable or correctable at the receiver), but different PLPs are more or less equally affected to a much smaller extent.

An apparatus for mapping error correction code encoded time-domain data of at least two, preferably a plurality of, mapping input data streams onto a time-domain mapping output data stream having a frame structure, which is adapted for applying this embodiment, could then comprise a data input for receiving at least two mapping input data streams carrying error correction code encoded data, a data mapper for mapping said at least two mapping input data streams onto frames of said mapping output data stream such that in each frame sequentially arranged various mapping input data streams are sequentially arranged and that from frame to frame the mapping (in particular the sequence and/or the size) of the various mapping input data streams is different, and a data output for outputting said mapping output data stream.

A corresponding apparatus for de-mapping a time-domain de-mapping input data stream having a frame structure into at least two de-mapping output data streams carrying error correction code encoded time-domain data, could then comprise a data input for receiving said time-domain de-mapping input data stream having a frame structure of frames, wherein in each frame sequentially arranged various de-mapping output data streams are sequentially arranged and wherein from frame to frame the mapping (in particular the sequence and/or the size) of the various de-mapping output data streams is different, a data de-mapper for de-mapping the frames of said de-mapping input data stream into said at least two de-mapping output data streams, wherein from frame to frame the de-mapping of said de-mapping input data stream into said at least two de-mapping output data streams is made differently, and a data output for outputting said at least two de-mapping output data streams.

It shall be noted that the above described variations and embodiments are generally also applicable in the same or an equivalent manner on this embodiment (as illustrated with reference to FIG. 14) of such an apparatus for mapping and an apparatus for de-mapping.

The proposed mapping and de-mapping according to the present invention helps to improve the performance of all communications or data transmission systems that are affected by regular fades in time direction. This is especially of importance for all kinds of mobile receivers that suffer from Doppler frequencies causing exactly these regular time fading effects. The proposed invention can be easily adapted for use on the existing DVB-T2 architecture and could be a potential addition for other (existing or upcoming) DVB standards, such as the upcoming DVB-NGH standard. However, the invention can generally also be applied to other digital mobile systems, like DAB or MediaFLO, which suffer from similar regular slicing or time interleaving. Tests have shown that the performance of such systems can be dramatically decreased by applying the suitable Doppler frequencies to the receiver, i.e. related receiver velocities, which problem could be overcome by application of the method as proposed by the present invention.

An embodiment illustrating the application of the present invention in a DAB system shall be explained with reference to FIGS. 15 and 16.

Figure 15:
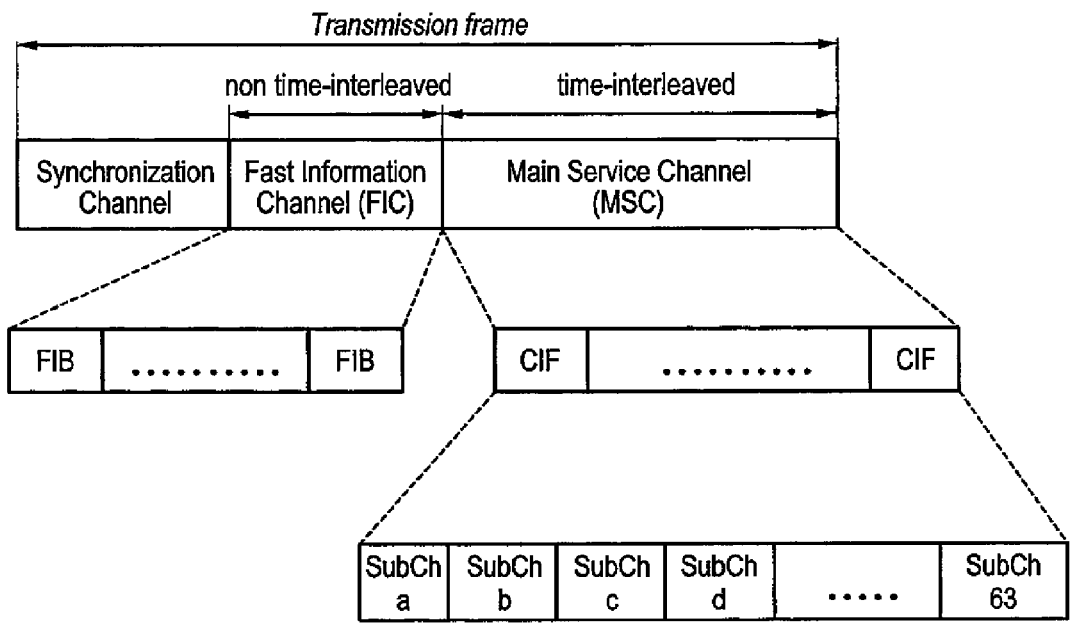
FIG. 15 shows the structure of a transmission frame as used according to DAB.

FIG. 15 shows the structure of a transmission frame as described in the DAB standard (ETS 300 401 "Radio broadcasting systems; Digital Audio Broadcasting (DAB) to mobile, portable and fixed receivers", May 1997, RE/JPT-00DAB-4). The DAB transmission system combines three channels, in particular a Synchronization Channel which is used internally with the transmission system for basic demodulator functions (e.g. transmission frame synchronization), a Fast Information Channel (FIC) which is used for rapid access of information by a receiver, which is a non-time-interleaved data channel and which can be sub-divided into Fast Information Blocks (FIBs), and a Main Service Channel (MSC) which is used to carry audio and data service component and which is a time-interleaved data channel divided into a number of sub-channels, which are individually convolutionally coded.

The MSC can also be seen as being made up of Common Interleaved Frames (CIFs), comprising Capacity Units (CU) as smallest addressable units. Each sub-channel of the MSC occupies an integral number of consecutive CUs and is individually convolutionally encoded. More details regarding the structure of the transmission frame and its content can be found in the above cited DAB standards, which explanations are herein incorporated by reference.

Figure 16:
FIG. 16 shows several transmission frames with irregularly arranged sub-channels according to a further embodiment of the present invention.
Figure 16:
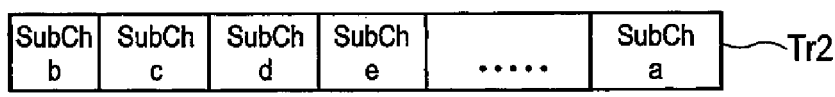
Figure 16:
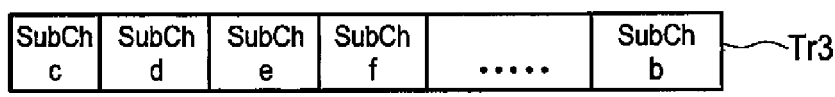

While, as shown in FIG. 15, the sub-channels SubCh a, SubCh b, . . . are sequentially arranged according to the standard, it is proposed in an embodiment of the present invention to change this regular structure from transmission frame to transmission frame as illustrated exemplarily in FIG. 16. FIG. 16 shows three subsequent transmission frames Tr1, Tr2, Tr3 in which the sequence of the sub-channels has been changed from frame to frame to avoid that regular fadings or other regular disturbances affect the same sub-channel(s) in each transmission frame.

This kind of irregular mapping of the sub-channels on the transmission frames can thus be used in a DAB transmission system, in particular in a transmitter and receiver of a DAB transmission system. For instance, the mapping can be provided in a separate mapping apparatus or in the (already available) Main Service Multiplexer, Transmission Frame Multiplexer or FIC and MSC symbol generator. A mapping apparatus and a corresponding de-mapping apparatus can be adapted in the same way as described above for the embodiment for DVB illustrated with reference to FIG. 14, wherein the sub-channels of the embodiment for DAB correspond to the physical layer pipes (generally the mapping input data streams) of this embodiment for DVB, and wherein the transmission frames of the embodiment for DAB correspond to the frames of this embodiment for DVB.

In the above, various embodiments for providing an irregular mapping structure in the mapping output data stream have been described. These embodiments include variations of the sequence of mapping input data streams, from which the data blocks are mapped onto the frame intervals, from frame interval to frame interval and/or variations of the sizes of the data blocks from frame interval to frame interval. These embodiments further include variations of the sequence of data streams (e.g. physical layer pipes or sub-channels) within subsequent frames (e.g. DVB T2-frames or transmission frames). According to further embodiments it is possible to employ an irregular mapping structure by providing variations in the size of data streams (e.g. physical layer pipes or sub-channels) within subsequent frames (e.g. DVB T2-frames or transmission frames). Further, also the sizes of frame intervals and/or frames can be varied from frame interval to frame interval.

All the above described variations can be employed from frame interval to frame interval and/or from frame to frame. But it is further also possible to employ such variations only after a number of frame intervals and/or frames. For instance, it is possible that in a first group of frame intervals a first kind of (identical) variation is applied, that in a second group of frame intervals a second kind of (identical) variation is applied, and so on. The same measure can be applied to the variations of frames. Further, combinations of those variations are also possible.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An apparatus that maps error correction code encoded time-domain data of at least two mapping input data streams onto a time-domain mapping output data stream having a frame structure, the apparatus comprising:
   circuitry configured to:
      receive said at least two mapping input data streams, each of said at least two mapping input data streams being segmented into data blocks carrying error correction code encoded data,
      map the data blocks of said at least two mapping input data streams onto frames of said time-domain mapping output data stream, each frame of said frames comprising a number of frame intervals, wherein the circuitry is configured to map the data blocks onto said frame intervals such that each frame interval of said frame intervals carries the data blocks sequentially arranged from the mapping input data streams of said mapping input data streams, and such that within said frame a sequence of mapping input data streams, from which the data blocks are mapped onto said frame interval, and the size of the data blocks arranged within said frame interval is different from frame interval to frame interval of said frame intervals, and output said time-domain mapping output data stream, a transmitter unit that transmits said time-domain mapping output data stream.

2. The apparatus as claimed in claim 1, wherein the circuitry is configured to map the data blocks onto said frame intervals such that within said frame the sequence of mapping input data streams, from which the data blocks are mapped onto said frame interval, and the size of the data blocks arranged within said frame interval is different for all of said frame intervals of said frame.

3. The apparatus as claimed in claim 1, wherein the circuitry is configured to map the data blocks onto said frame intervals such that the sequence of mapping input data streams, from which the data blocks are mapped onto said frame intervals of said frame, and the size of the data blocks arranged within said frame interval is different from frame to frame for a plurality of subsequent frames or for all of said frames.

4. The apparatus as claimed in claim 1, wherein the circuitry is configured to map the data blocks onto said frame intervals such that within said frame each of said frame interval comprises one of the data block from each of said mapping input data stream.

5. The apparatus as claimed in claim 1, wherein the circuitry is configured to embed mapping information into said time-domain mapping output data stream, the mapping information comprising information about a mapping structure of a mapping of the data blocks onto said frame intervals for enabling a correct de-mapping of said time-domain mapping output data stream.

6. The apparatus as claimed in claim 1, wherein the circuitry is configured to generate a mapping rule for use by the circuitry for mapping the data blocks onto said frame intervals according to said mapping rule.

7. The apparatus as claimed in claim 6, wherein the circuitry is configured to generate said mapping rule comprising sequence information for use by the circuitry in determining the sequence of mapping input data streams, from which data blocks are mapped onto said frame interval, and size information for use by the circuitry in determining the size of the data blocks arranged within said frame interval.

8. The apparatus as claimed in claim 6, wherein the circuitry is configured to generate a scrambling factor or a shift register, including a linear feedback shift register, for generating a shift factor for use as sequence information by the circuitry in determining the sequence of mapping input data streams, from which the data blocks are mapped onto said frame interval.

9. The apparatus as claimed in claim 1, wherein the circuitry is configured to receive said at least two mapping input data streams representing physical layer pipes, each of said physical layer pipes being segmented into subslices or bursts carrying error correction code encoded data.

10. The apparatus as claimed in claim 1, wherein the sequence is a sequence in the time-domain of mapping input data streams, from which the data blocks are mapped onto said frame interval.

11. A method of mapping error correction code encoded time-domain data of at least two mapping input data streams onto a time-domain mapping output data stream having a frame structure, the method comprising:

receiving said at least two mapping input data streams, each of said at least two mapping input data streams being segmented into data blocks carrying error correction code encoded data, mapping, using circuitry, the data blocks of said at least two mapping input data streams onto frames of said time-domain mapping output data stream, each frame of said frames comprising a number of frame intervals, wherein the circuitry is configured to map the data blocks onto said frame intervals such that each frame interval of said frame intervals carries the data blocks sequentially arranged from the mapping input data streams of said mapping input data streams and that within said frame a sequence of mapping input data streams, from which the data blocks are mapped onto said frame interval, and the size of the data blocks arranged within said frame interval is different from frame interval to frame interval of said frame intervals, outputting said time-domain mapping output data stream, and transmitting said time-domain mapping output data stream.

12. A non-transitory computer readable medium including executable instructions, which when executed by a computer cause the computer to execute a method of mapping error correction code encoded time-domain data of at least two mapping input data streams onto a time-domain mapping output data stream having a frame structure, the method comprising:

receiving said at least two mapping input data streams, each of said at least two mapping input data streams being segmented into data blocks carrying error correction code encoded data, mapping the data blocks of said at least two mapping input data streams onto frames of said time-domain mapping output data stream, each frame of said frames comprising a number of frame intervals, the mapping of the data blocks onto said frame intervals being such that each frame interval of said frame intervals carries the data blocks sequentially arranged from the mapping input data streams of said mapping input data streams and that within said frame a sequence of mapping input data streams, from which the data blocks are mapped onto said frame interval, and the size of the data blocks arranged within said frame interval is different from frame interval to frame interval of said frame intervals, outputting said time-domain mapping output data stream, and transmitting said time-domain mapping output data stream.

* * * * *